United States Patent

Gordon et al.

[15] 3,665,652
[45] May 30, 1972

[54] GRINDING SYSTEM

[72] Inventors: Bernard M. Gordon, Magnolia; Leopold Neumann, Lexington; Ivan H. Kirsch, Hyde Park, all of Mass.

[73] Assignee: Gordon Engineering Company, Wakefield, Mass.

[22] Filed: Oct. 21, 1970

[21] Appl. No.: 82,631

[52] U.S. Cl. .......................................51/165.71, 51/165.77
[51] Int. Cl. ..........................................................B24b 49/70
[58] Field of Search..........51/165 R, 165.71, 165.74, 165.75, 51/165.76, 165.77, 165.83, 165.91, 165.92

[56] References Cited

UNITED STATES PATENTS

| | | | |
|---|---|---|---|
| 2,042,257 | 5/1936 | Harrison et al. | 51/165.83 |
| 2,984,953 | 5/1961 | Neal | 51/165.74 |
| 3,264,788 | 8/1966 | Coes et al. | 51/165 R |
| 3,353,302 | 11/1967 | Lowy | 51/165 R X |
| 3,550,327 | 12/1970 | Kusakabe et al. | 51/165.92 |

*Primary Examiner*—Lester M. Swingle
*Attorney*—Morse, Altman & Oates

[57] ABSTRACT

A grinder having a workpiece mounted thereon is operatively connected to a tracking analog to digital converter via a sensor unit. The analog to digital converter comprises a summing amplifier, a forward/backward counter, a gating control, and a digital to analog converter and defines a closed loop configuration. Signals at the output of the summing amplifier are applied to a peak detector which generates a signal representing the degree of out of round of the workpiece. Counting pulses generated by the counter are applied to a reset-delay via the gating control for generation of a signal indicating the rate of removal of material from the workpiece. Pulses representing the state of the counter are applied to a limit circuit which generates signals representing the amount of material removed from the workpiece.

13 Claims, 8 Drawing Figures

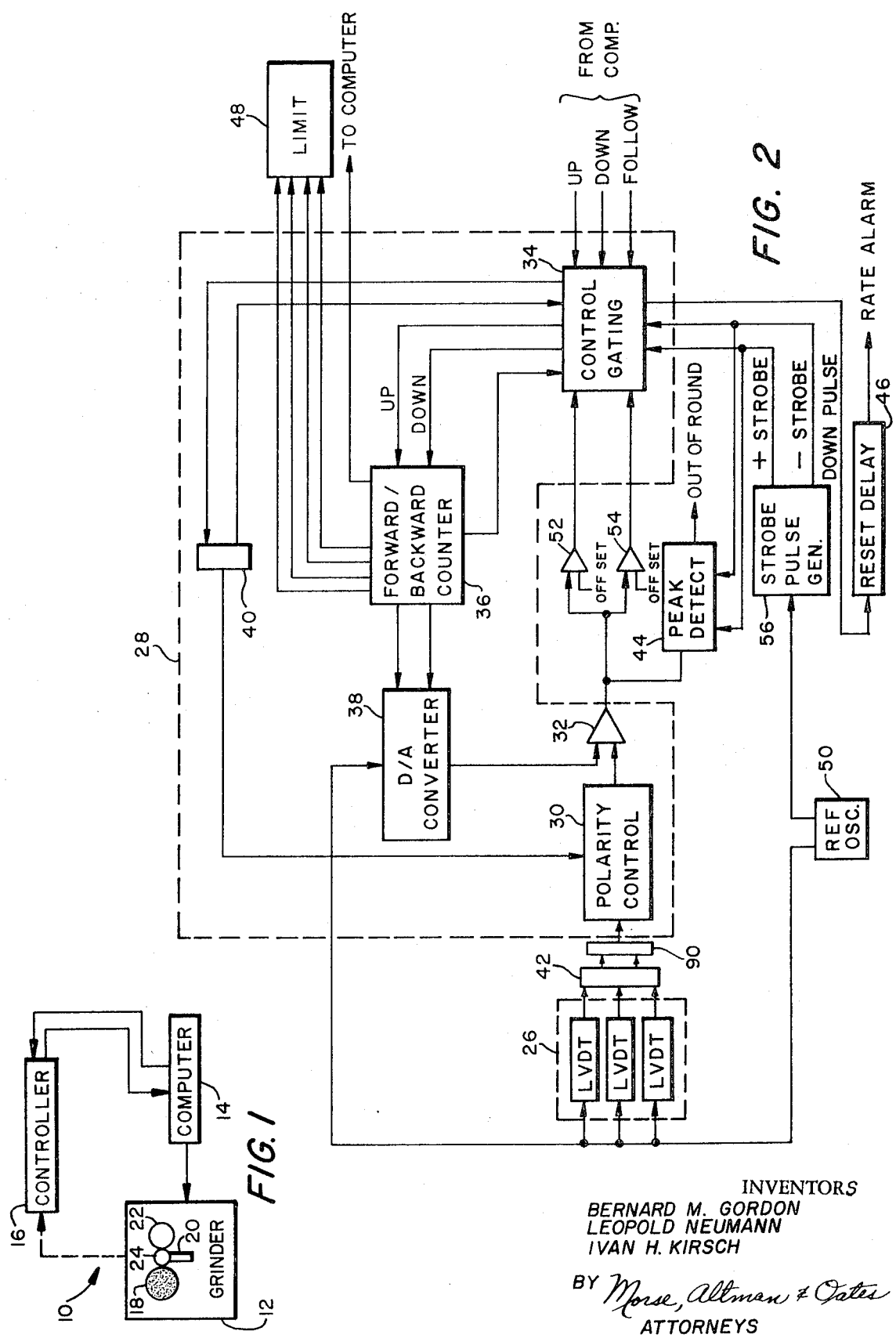

Patented May 30, 1972
3,665,652
2 Sheets-Sheet 2
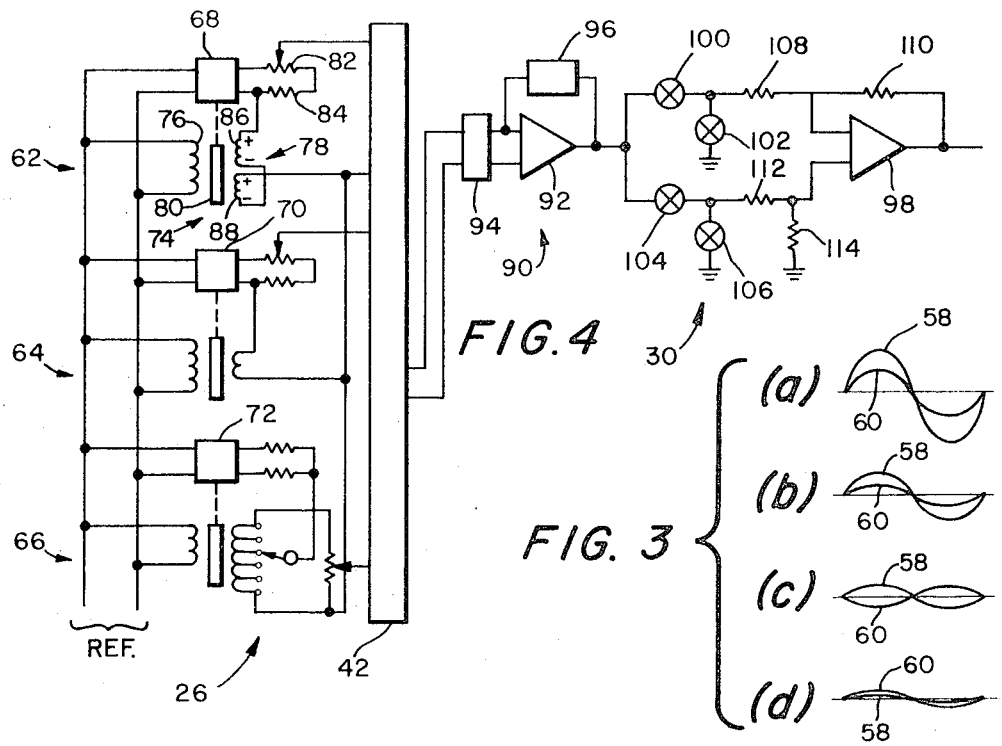
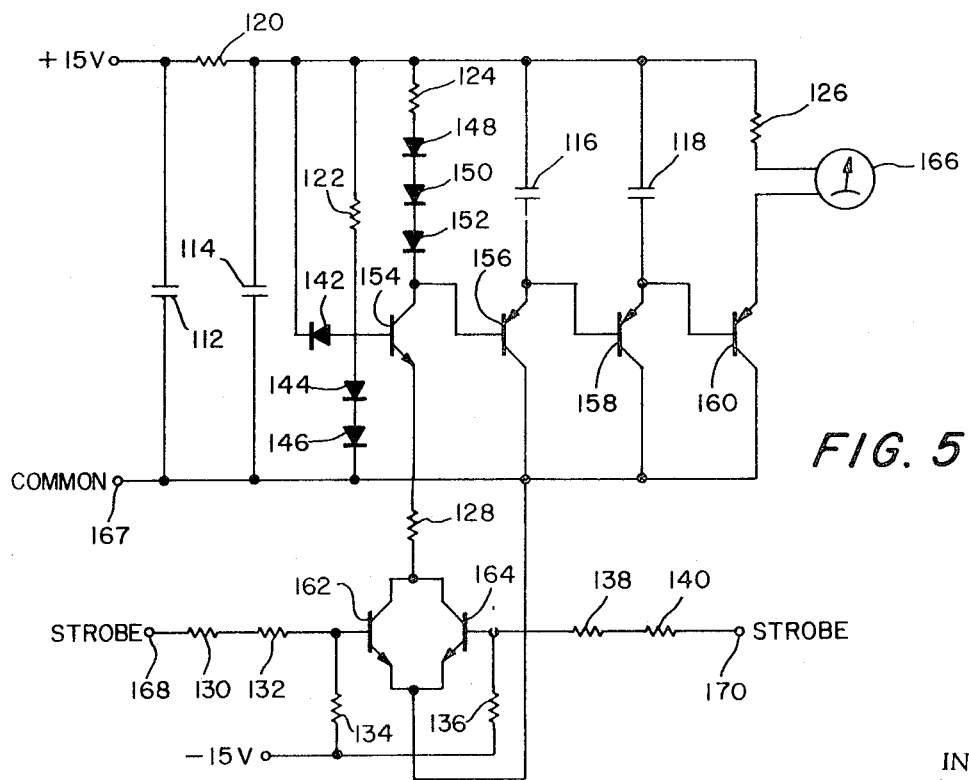
INVENTORS
BERNARD M. GORDON
LEOPOLD NEUMANN
IVAN H. KIRSCH
BY Morse, Altman & Oates
ATTORNEYS 3,665,652

GRINDING SYSTEM

BACKGROUND OF THE INVENTION

1. Field of Invention

The invention relates to grinding and more particularly to an automated grinding system which provides output data representing the amount of material removed from a workpiece, the rate of removal of material, and the degree of out of round of the workpiece.

2. Description of the Prior Art

Various automated systems have been developed for removing material from a workpiece by the cutting action of a solid, rotating grinding wheel. Although grinding is sometimes used for the complete machining operation on surfaces, it is generally considered a finishing process used to obtain a fine surface finish and accurate dimensional tolerance. Heretofore, the peripheral equipment required for automated grinding systems has been complex in construction and costly in production.

BRIEF SUMMARY OF THE INVENTION

It is an object of the present invention to provide an automated grinding system characterized by a grinder and a controller for processing a workpiece by means of a grinding wheel. The controller comprises a sensor unit and a tracking analog to digital converter. The analog to digital converter, connected in a closed loop configuration, includes a summing amplifier, a forward/backward counter, a gating control, and a digital to analog converter. In operation, signals at the output of the sensor unit and signals generated by the digital to analog converter are applied to the input terminals of the summing amplifier. The signal at the output of the summing amplifier, which represents the difference between the sensor unit output signal and the digital to analog converter output signal, is applied to a peak detector which generates a signal representing the degree of out of round of the workpiece and is applied to the gating control which generates command signals to the forward/backward counter. Signals generated by the forward/backward counter are applied to the digital to analog converter for control thereof and to limit circuits which indicate the amount of material removed from the workpiece. Counting pulses generated by the forward/backward counter are fed to a reset-delay circuit via the gating control for generation of a signal representing the rate of removal of material from the workpiece. The combination of grinder and controller is such as to provide an expeditious grinding system.

The invention accordingly comprises the system possessing the construction, combination of elements, and arrangements of parts that are exemplified in the following detailed disclosure, the scope of which will be indicated in the appended claims.

BRIEF DESCRIPTION OF DRAWINGS

For a fuller understanding of the nature and objects of the present invention, reference should be had to the following detailed description taken in connection with the accompanying drawings, wherein:

FIG. 1 is a block diagram of a grinding system made according to the invention;

FIG. 2 is a detailed block and schematic diagram of FIG. 1;

FIGS. 3a–3d are graphical representations, in time sequence, of the output signals from the sensing unit and digital to analog converter of FIG. 2;

FIG. 4 is a schematic diagram of the sensing and polarity control circuits of FIG. 2; and FIG. 5 is a schematic diagram of the peak detector of FIG. 2.

DETAILED DESCRIPTION OF INVENTION

In FIG. 1, there is shown a grinding system 10, for example a computerized grinding system, which comprises a grinder 12, a computer 14, and a controller 16. Grinder 12 includes a grinding wheel 18, a support 20, and a regulating wheel 22. In the grinding process, a workpiece 24 is passed between grinding wheel 18 revolving at high speed and regulating wheel 22 revolving at a slow speed over support 20. The pressure which grinding wheel exerts as it turns, drives workpiece 24 into contact with regulating wheel 22 and support 20. Regulating wheel 22 compels workpiece 24 to rotate in the opposite direction to that of grinding wheel 18. Computer 14 is responsive to signals generated by controller 16 and governs the operation of grinder 12 during the grinding process. Signals representing the amount of material removed, the rate of material removal, and the degree of out of round of workpiece 24 are generated by controller 16.

Referring now to FIG. 2, it will be seen that controller 16 comprises a sensor unit 26 and a tracking analog to digital converter 28. Generally, analog to digital converter 28 includes a polarity control 30, a summing amplifier 32, a gating control 34, a forward/backward counter 36, a digital to analog converter 38 and a sign flip-flop 40. The constituent parts of analog to digital converter 28 are connected in a closed loop configuration; i.e., the signals at the output of summing amplifier 32 are fed to the input of forward/backward counter 36 via gating control 34, the signals at the output of forward/backward counter 36 are applied to the input of digital to analog converter 38, and the signals at the output of digital to analog converter 38 are fed to one input of summing amplifier 32. The other input of summing amplifier 32 receives the signal at the output of sensor unit 26 via a multiplexer 42 and polarity control 30. Sign flip-flop 40 receives an input signal from gating control 34 and generates a sign signal and the sign signal complement to polarity control 30 and gating control 34, respectively. The sign signal governs the polarity of the signal applied to the input of summing amplifier from sensor unit 26.

In the grinding process, the signals as at the output of summing amplifier 32 are applied to a peak detector 44 which generates a signal representing the degree of out of round of workpiece 24. Compound down pulses, i.e., down pulses or negative up pulses, as at the output of gating control 34, fed thereto from forward/backward counter 36, are applied to a reset-delay circuit 46 for generation of a rate alarm signal which indicates that material is not being removed from workpiece 24. In other words, a first compound down pulse applied to reset-delay circuit 46 is delayed; a second compound down pulse applied to reset-delay circuit 46 resets the circuit and is delayed. If there is no third compound down pulse for a preset-time, i.e., for the delay time of reset-delay circuit 46, the delayed second compound down pulse is applied to a triggering and indicating circuit (not shown) for denoting that no material has been removed from workpiece 24. Counting pulses representing the state of forward/backward counter 36 are applied to limit circuits 48 which are preset to generate signals in response to specific counting states of forward/backward counter 36. That is, when forward/backward counter 36 has registered a particular count value, limit circuits 48 are triggered to generate a signal denoting that a specified amount of material has been removed from workpiece 24.

As previously indicated, the signals at the output of sensor unit 26 are applied to one input of summing amplifier 32 via multiplexer 42 and polarity control 30; and the signals as at the output of digital to analog converter 38 are fed directly to the other input of summing amplifier 32. It is to be noted, as hereinafter described, that the signals at the inputs of summing amplifier 32 define sine wave signals which are derived from a common reference signal. That is, a signal generated by a source 50, for example a 5KH$_2$ oscillator is applied to sensor unit 26 and digital to analog converter 38 as a common reference. The signal at the output of summing amplifier 32 is the difference between the signals applied at its inputs. The signals at the output of sensor unit 26 are a function of the dimensional characteristics of workpiece 24 and the signals at the output of digital to analog converter 38 represent the state of forward/backward counter 36. When forward/backward counter 36 is programmed to count down pulses only, for example, i.e., gating control 34 is inhibited by computer 14 from allowing up pulses to be applied to forward/backward counter 36, the signal as at the output of summing amplifier 32 is the difference between the lowest count value registered in counter 36 and the present dimensional value of workpiece 24. Accordingly, the signals at the output of summing amplifier which are peak detected in detector 44 represent the degree of out of round of workpiece 24. It will be readily appreciated that, by selectively inhibiting gating control 34, forward/backward counter is programmed to count up only, count down only, or follow.

The signals as at the output of summing amplifier 32 are applied also to gating control 34 via comparators 52 and 54. In the illustrated embodiment, each comparator is provided with an offset signal so that when the signal at the output of digital to analog converter 38 is greater than the signal from sensing unit 26, the signal at the output of summing amplifier 32 is fed to gating control 34 via comparator 52; and when the signal at the output of sensing unit 26 is greater than the signal at the output of digital to analog 38, the signal at the output of sensing amplifier 32 is fed to control gating 34 via comparator 54. That is, the signal at the output of comparators 52 and 54 are such that forward/backward counter 36 is pulsed to count either up or down so as to make the signals at the input terminals of summing amplifier 32 equal. In order to minimize quadrature errors, the difference signals applied to control gating 34 from summing amplifier 32 are sampled at the peak of the reference signal at the output of oscillator 50. This is accomplished by applying the reference signal from oscillator 50 to a strobe pulse generator 56 which generates positive and negative enable strobe pulses to control gating 34.

As previously indicated, the signals at the output of control gating 34, either up count or down count, are applied to forward/backward counter 36 and the signals as at the output of forward/backward counter 36, representing the state of the counter, are applied to limit circuits 48 to provide an indication that a specified amount of material has been removed from workpiece 24. It will be appreciated that, when forward/backward counter 36 is programmed to count down only, the rate of change of the counter, i.e., the rate of change of the input pulses applied thereto, is the rate of material removal from workpiece 24.

The signals as at the output of digital to analog converter 38, which are responsive to the signals from forward/backward counter 36, are such as to make the signal at output of summing amplifier 32 zero. Referring now to FIGS. 3a-3d, by way of example, there is shown a graphical representation of the signal at the output of digital to analog converter 38 which is denoted by reference character 58 and the signal at the output of sensor unit 26 which is denoted by reference character 60. As illustrated in FIG. 3a, the signal as at the output of digital to analog converter 38 is larger than the signal at the output of sensor unit 26. As material is removed from workpiece 24, the signal at the output of sensing unit 26 decreases and the signal at the output of analog to digital converter 38 decreases so as to make the signals at the input terminals of summing amplifier 32 equal. As more material is removed from workpiece 24, the signal at the output of sensor unit 26 continues to decrease until it passes through zero, as illustrated in FIG. 3c, and the signal at the output of digital to analog converter 38 approaches zero. It will be readily appreciated that, at the time the signal at the output of digital to analog converter 38 is zero, the signal at the output of summing amplifier 32 is not zero because the signal at the input terminals of summing amplifier 32 are not equal. That is, the signal at the output of sensor unit 26 is negative while the signal at the output of digital to analog converter 38 is approaching zero. Accordingly, when the signal at the output of sensor unit 26 passes through zero and becomes negative, gating control 34 generates a signal which is applied to sign flip-flop 40, whereby sign flip-flop 40 changes state.

The signal as at the output of sign flip-flop 40 is applied to polarity control 30, in consequence the phase of signal 60 is changed to 180° and the negative sensor output signal becomes positive as shown in FIG. 3d. The complement sign signal applied to gating control 34 programs counter 36 so that the signal at the output of digital to analog converter 38 is such as to make the signal at the output of summing amplifier 32 zero.

For a fuller understanding of sensor unit 26 and polarity control 30, reference is now made to FIG. 4. Sensor unit 26 comprises a plurality of sensors 62, 64, and 66 which are operatively connected to grinder heads 68, 70, and 72, respectively. Sensor 62 includes a linear variable differential transformer 74 having coils 76, 78 and a slug 80. Coil 76 and the output terminals of head 68 are connected to the reference signal generated by oscillator 50. Resistors 82 and 84 are serially connected between the output terminals of head 68. By way of example, resistor 82 is a variable resistor and is used as a gain control, the wiper arm of resistor 82 being connected to multiplexer 42. One side of coil 78 is connected to the junction of the output terminal of head 68 and resistor 84 and the other side of coil 78 is connected to multiplexer 42. Sensors 64 and 66 are similar to sensor 62 with the exception that sensor 66 is provided with a multi-tap secondary which is used as an offset.

In order to illustrate the operation of linear variable differential transformer 74, coil 78 is shown as having windings 86 and 88. The reference signal generated by oscillator 50 and applied to coil 76 is coupled to windings 86 and 88. As slug 80 is moved in response to changing dimensional characteristics of workpiece 24, the signal coupled to one of the windings is greater than the signal coupled to the other winding. Accordingly, the phase of the signal as at the output of coil 78 specifies the location of slug 80 and the dimensional characteristics of workpiece 24. Selected signals at the output of sensing unit 26 are applied to polarity control 30 via multiplexer 42 and a bandpass filter 90.

Filter 90 comprises an amplifier 92 having a high pass filter 94 connected across its input terminals and a low pass filter 96 connected as a feedback loop. Polarity control 30 comprises an amplifier 98; a plurality of switches 100, 102, 104, and 106; and resistors 108, 110, 112, and 114. The output terminal of amplifier 92 is connected to one side of switches 100 and 104. The other side of switch 100 is connected to one side of switch 102 and one side of resistor 108. The other side of resistor 108 and one side of resistor 110 are connected to the inverting input of amplifier 98, the other side of resistor 110 is connected to the output terminal of amplifier 98. The other side of switch 104 is connected to one side of switch 106 and one side of resistor 112. The other side of resistor 112 is connected to one side of resistor 114 and the non-inverting input of amplifier 98. The other sides of switches 102, 106 and resistor 114 is connected to ground. In the illustrated embodiment, when switch 100 is closed, switches 102 and 104 are opened and switch 106 is closed; and when switch 104 is closed switches 100 and 106 are opened and switch 100 is closed. The state of switches 100, 102, 104, and 106, i.e. opened or closed, is controlled by the signal as at the output of sign flip-flop 40. It will be readily appreciated that, by selectively controlling the states of switches 100, 102, 104, and 106, the polarity of the signal as at the output of amplifier 98 is controlled.

For a fuller understanding of peak detector 44, reference is now made to FIG. 5. Peak detector 44 comprises capacitors 112, 114, 116, and 118; resistors 120, 122, 124, 126, 128, 130, 132, 134, 136, 138, and 140; diodes 142, 144, 146, 148, 150, and 152; and transistors 154, 156, 158, 160, 162, and 164. One side of capacitor 112 is connected to one side of resistor 120, the other side of resistor 120 is connected to one side of capacitor 114. One side of resistor 122, resistor 124, capacitor 160, capacitor 118, and resistor 126 is connected to junction of capacitor 114 and resistor 120. The other side of resistor 122 is connected to the cathode of diode 144, the anode of diode 144 being connected to the cathode of diode 146. The other side of resistor 124 is connected to the cathode of diode 148, the anode of which is connected to the cathode of diode 150. The anode of diode 150 is connected to the cathode of diode 152 and the anode of diode 152 is connected to the collector of transistor 154 and the base of transistor 156. The other side of capacitor 116 is connected to the emitter of transistor 156 and the base of transistor 158. The other side of capacitor 118 is connected to the emitter of transistor 158 and the base of transistor 160. The other side of resistor 126 and the emitter of transistor 160 are connected to a meter 166. The other side of capacitor 112, 114, the anode of diode 146, the collector of transistor 156, the collector of transistor 156, and the collector of transistor 160 are connected to a common return 167 for example a ground. The emitter of transistor 154 is connected to the collector of transistors 162 and 164 through resistor 128. The emitters of transistors 162 and 164 are connected to common return 167. The base of transistor 162 is connected to the base of transistor 164 through serially connected resistors 134 and 136. A voltage, for example negative 15 volts, is applied at the junction of resistors 134 and 136. A strobe signal 168 is applied to the base of transistor 162 via serially connected resistors 130 and 132, and a strobe signal 170 is applied to the base of transistor 164 through serially connected resistors 138 and 140. A voltage, for example positive 15 volts, is applied to the junction of resistor 120 and capacitor 112. Capacitor 112 resistor 120 and capacitor 114 define a filter network for the positive 15 volts.

In operation, the signal as at the output of summing amplifier 32, which represents the difference between the lowest count value registered in counter 36 and the present dimensional value of workpiece 24, is applied to the base of transistor 154 through diode 142. Transistor 154 is alternately switched by strobe pulse 168 and strobe pulse 170, the strobe pulses being offset from each other. That is, when strobe pulse 168 is applied to the base of transistor 162, transistor 162 conducts whereby transistor 154 conducts. When strobe pulse 170 is applied to the base of transistor 164, transistor 164 conducts, whereby transistor 154 conducts. When transistor 154 is in a conducting state, the voltage at the base of transistor 156 drops, whereby transistor 156 is energized to a conducting state and capacitor 116 is charged. As capacitor 116 is charged, the voltage at the base of transistor 156 become increasingly negative until transistor 156 is in a conducting state. In consequence, capacitor 118 is charged. In other words, capacitors 116 and 118 define a pulse stretching network. As capacitor 118 is charged, the base of transistor 160 is pulled negative, whereby transistor 160 is in a conducting state. In consequence, of transistor 160 conducting, meter 166 provides an indication of the degree of out round of workpiece 24.

In summary, the invention provides a tracking analog to digital converter-grinder combination for processing a workpiece and for generating data signals representing the amount of material removed from the workpiece, the rate of removal of the material, and the degree of out of round of the workpiece.

Since certain changes may be made in the foregoing disclosure without departing from the scope of the invention involved, it is intended that all matter contained in the above description and depicted in the accompanying drawings be construed in an illustrative and not in a limiting sense.

We claim:

1. A system for grinding a workpiece comprising:
 a. grinding means;
 b. sensor means operatively connected to said grinding means for generating a signal representing the dimensional characteristics of the workpiece; and
 c. tracking analog to digital converter means electrically communicating with said sensor means for providing output signals representing the rate of removal of material from the workpiece and the amount of material removed from the workpiece.

2. The system as claimed in claim 1 wherein said tracking analog to digital converter includes:
 a. gating control means;
 b. forward/backward counter means electrically connected to said gating control means;
 c. digital to analog converter means electrically connected to said forward/backward counter means; and
 d. means for providing an output signal, said means having at least two input means and an output means, one of said input means electrically communicating with said digital to analog converter means, the other of said input means operatively connected to said sensor means, said output means operatively connected to said gating control means.

3. The system as claimed in claim 2 including source means for providing a reference signal, said source means connected to said sensor means and said digital to analog converter means.

4. The system as claimed in claim 3 including strobe pulse generator means electrically connected to said source means and said gating control means.

5. The system as claimed in claim 2 including:
 a. sign means electrically connected to said gating control means for generating a control signal; and
 b. polarity control means electrically connected to said sign means, sensor means, and gating control means, the signal as at the output of said sensor means applied to said polarity control means, the signal as at the output of said polarity control means fed to said gating control means, the control signal generated by said sign means applied to said polarity control means for governing the polarity of the signal fed to said means for providing an output signal.

6. The system as claimed in claim 5 including multiplexer means interposed between said sensor means and said polarity control means.

7. The system as claimed in claim 2 including peak detector means electrically connected to said means for providing an output signal, said peak detector means generating a signal representing the degree of out of round of the workpiece.

8. The system as claimed in claim 2 including limit means electrically communicating with said forward/backward counter means for providing an indication of the amount of material removed from the workpiece, said limit means responsive to signal generated by said forward/backward counter means.

9. The system as claimed in claim 2 including reset-delay means electrically communicating with said gating control means for providing an output signal representing the rate of material removed from the workpiece.

10. The system as claimed in claim 1 wherein said sensor means includes at least one linear variable differential transformer means.

11. A system for grinding a workpiece comprising:
 a. grinding means;
 b. sensor means operatively connected to said grinding means;
 c. gating control means;
 d. forward/backward counter means electrically connected to said gating control means;
 e. digital to analog converter means electrically connected to said forward/backward counter means; and
 f. means for providing an output signal, said means having at least two input means and an output means, one of said input means eletrically communicating with said digital to analog converter means, the other of said input means operatively connected to said sensor means, said output means operatively connected to said gating control means.

12. The system as claimed in claim 11 including:
 a. multiplexer means electrically communicating with said sensor means;
 b. sign means electrically connected to said gating control means for generating a control signal; and c. polarity control means electrically connected to said sign means, multiplexer means, and gating control means, the signal as at the output of said sensor means applied to said polarity control means via said multiplexer means, the signal as at the output of said polarity control means fed to said gating control means, the control signal generated by said sign means applied to said polarity control means for specifying the polarity of the signal fed to said means for providing an output signal.

13. The system as claimed in claim 12 including:
a. peak detector means electrically connected to said means for providing an output signal, said peak detector means generating a signal representing the degree of out of round of the workpiece;
b. limit means electrically communicating with said forward/backward counter means for providing an indication of the amount of material removed from the workpiece, said limit means responsive to signal generated by said forward/backward counter means; and
c. reset-delay means electrically communicating with said gating control means for providing an output signal representing the rate of material removed from the workpiece.

* * * * *